United States Patent [19]

Remley et al.

[11] Patent Number: 4,991,147
[45] Date of Patent: Feb. 5, 1991

[54] PREFORMED BEAM TRACKER

[75] Inventors: Winslow R. Remley, Fairfax Station, Va.; Michael N. Witlin, Vestal, N.Y.

[73] Assignee: The United States of America as represented by the Secretary of the Navy, Washington, D.C.

[21] Appl. No.: 355,347

[22] Filed: Apr. 26, 1973

[51] Int. Cl.[5] ............................ G01S 3/80; G01S 3/28
[52] U.S. Cl. .................................... 367/123; 342/378; 342/432; 342/437; 367/100; 367/122; 367/125; 367/127; 367/129

[58] Field of Search ........ 343/117 A, 113 R, 100 CL; 340/16 P, 16 R, 6 R; 367/100, 122, 123, 125, 127, 129; 342/378, 432, 437

[56] References Cited

U.S. PATENT DOCUMENTS 3,579,180  5/1971  Taddeo ........................ 343/100 CL
3,763,490  10/1973  Hadley et al. ..................... 340/6 R Primary Examiner—Linda J. Wallace
Attorney, Agent, or Firm—Robert W. Adams

[57] ABSTRACT

Apparatus and method for sonar or radar target tracking. Digital apparatus and techniques are employed. A variable delay is used for beam steering.

6 Claims, 2 Drawing Sheets

PREFORMED BEAM TRACKER

BACKGROUND OF THE INVENTION

The invention is in the field of electronic surveillance with particular applicability to sonar-radar installations.

In the prior art various schemes have been employed in sonar and radar apparatus for target tracking. In most sonar systems electro-mechanical apparatus has been employed for beam forming. For example one prior art target tracking arragement uses a servo-actuated beamformer to form two half-beams in identical directions. The outputs of the two half-beams are compared to determine if the target signals they contain coincide in time or if one signal is retarded in time with respect to the other. Usually the comparison of the half-beam outputs is accomplished by phase shift and cross-correlation techniques to develop a tracker error signal. The error signal indicates the magnitude and direction the two parallel half-beams must be moved in order to continually track the moving sonar target. Integrating circuits smooth the error signal to reduce random fluctuations in the indicated target direction. The random tracker error can be made arbitrarily small by making the smoothing time arbitrarily large, but this limits the rate at which the tracker can follow a moving target.

A disadvantage of prior art target tracking designs is that a separate electro-mechanical servo-actuated beamformer must be provided for every target that is tracked. The systems are not compatible with modern digital beamformers which form a large number of digital beams essentially simultaneously using time shared digial circuits.

Our invention overcomes these problems of the prior art by providing a target tracking system having means for digital generation of the tracker error signal and improved means for switching between half-beam pairs when the target moves in direction from one half-beam pair to an adjacent half-beam pair. Another object of our invention is to provide a hysteresis-like characteristic to prevent random switching between half-beam pairs when the target switches over. Another object of the invention is to obtain a better solution to the time quantization problem involved in target tracking by providing digital filter means for changing the time registration of one half-beam with respect to the other in very small increments.

SUMMARY OF THE INVENTION

The invention is an improved target tracking system which achieves greater efficiency than prior art devices. Digital beam forming means are employed and the tracking error signal is digitally generated. A digital filter is used to advance or retard the time registration of one half-beam signal relative to the other in very fine increments of a wave length. The invention provides a hysteresis-like characteristic to prevent random switching when a target crosses over between half-beam pairs.

DESCRIPTION OF THE PREFERRED EMBODIMENT

While the invention is applicable to both sonar and radar systems the preferred embodiment is shown in a sonar system by way of example.

Figure 2:
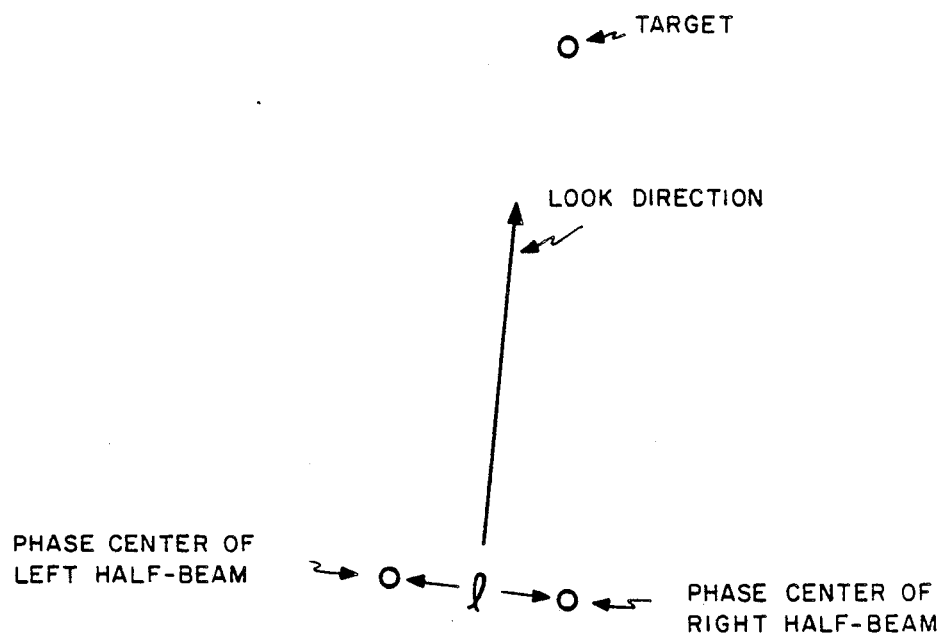
FIG. 2 illustrates a principle utilized in the invention.
Figure 1:
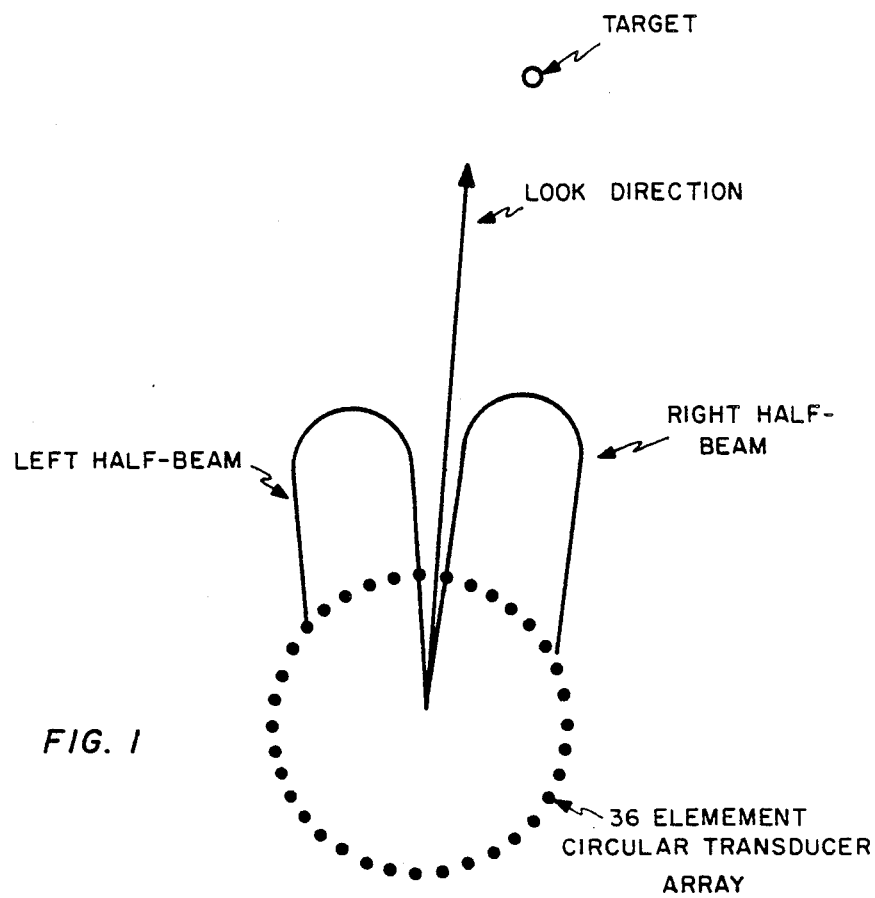
FIG. 1 illustrates a typical transducer array which can be used with the invention.

As previously noted, a serious disadvantages of prior art target tracking designs is the requirement that a separate electro-mechanical servo-actuated beamformer be provided for each target tracked. Furthermore, these systems are not compatible with modern digital beamformers. Modern digital beamformers form a large number of digital beams essentially simultaneously using time shared digital circuits. For example consider an array of 36 transducers spaced 10° apart on the perimeter of a circle. A digital beamformer is easily designed that forms 36 half-beam pairs where each pair is spaced 10° apart in azimuth as shown in FIG. 1. For each half-beam pair the 18 elements on the left of the look direction are used to form the left half-beam and the 18 elements on the right of the look direction are used to form the right half-beam. For target signals close to the half-beam pair look direction, the two half-beam target signals may be considered as having been received by two single transducers spaced a distance l apart. (l is the distance between the two half-beam phase centers). This analogy is illustrated in FIG. 2. By simple geometry (using FIG. 2) the difference in time of arrival of the target signal at the two half-beams is $(l/c) \sin \theta$ where l is the distance between half-beam phase centers, c is the speed of signal propagation and $\theta$ is the angle between half-beam look direction and target bearing. Therefore, if the difference in time-registration of the two half-beam target signals is known, the target bearing can be determined. To compute the target bearing accurately, it is necessary to know the time difference very accurately. To reduce the complexity of the digital beamformer, it is desirable to sample the outputs of the transducers at as low a rate as possible. To maintain the correct beam patterns, it is usually necessary to sample the transducer outputs at about 5 times per period of the highest signal frequency. Unfortunately, this sampling rate results in very coarse time quantization and phase resolution (72° for a sine wave signal) of the tracking half-beams. This coarse time quantization prevents straight-forward determination of the exact delay of one half-beam signal relative to the other half-beam signal since the signals are known and can be shifted in only one-fifth wavelength increments. The time quantization problem can be solved by sampling at a very high rate (e.g. 100 times the signal frequency) but in this case the size and complexity of the digital beamformer usually becomes unacceptable.

Figure 3:
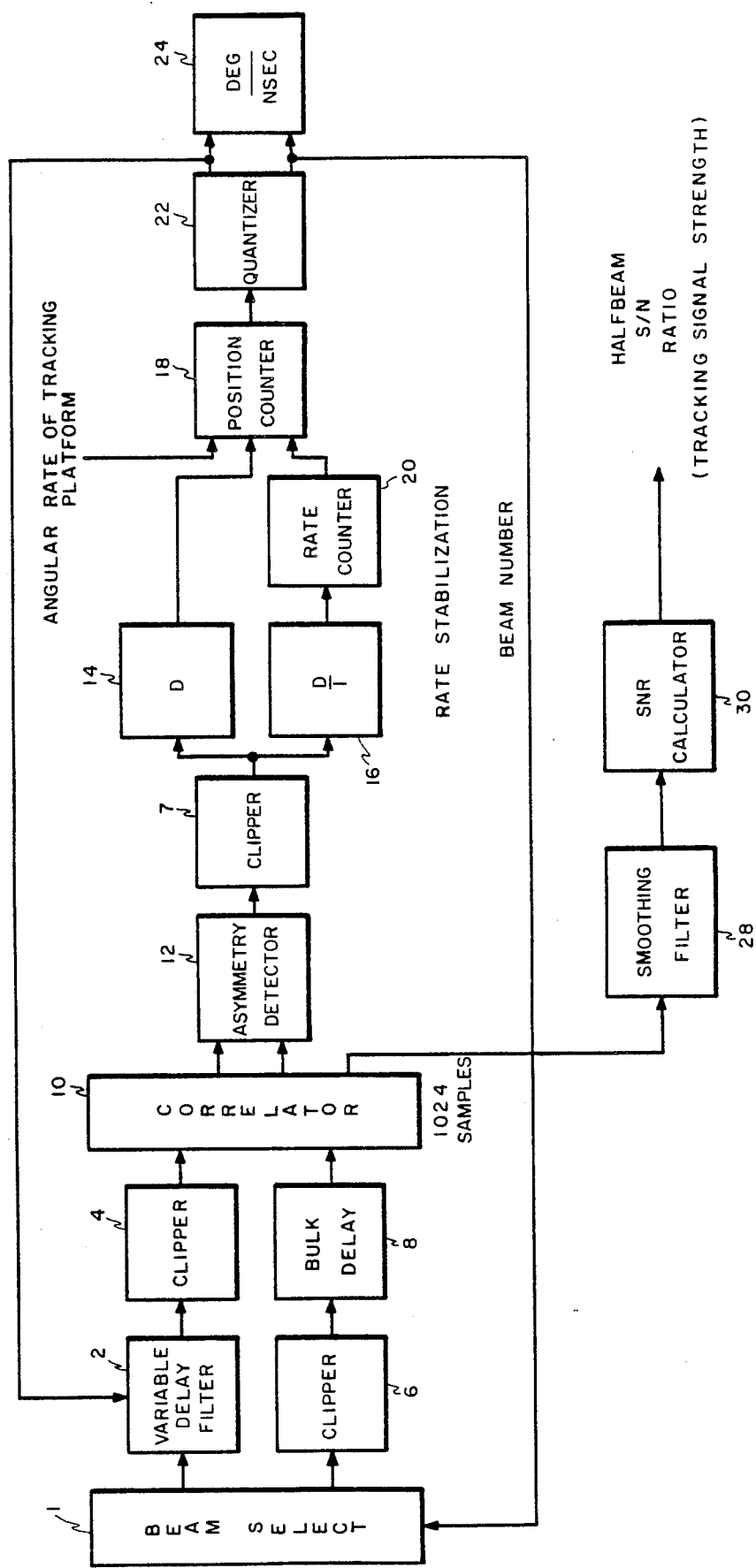
FIG. 3 is a block diagram of the invention.

A particular embodiment of our invention is shown in FIG. 3. This simplified block diagram represents the general points of the design of the digital tracker. The half-beams from a known beam selecting mechanism 1 are passed through a variable delay filter 2 which appropriately shifts the half beam outputs to steer the half-beams towards the best estimate of target position. The variable delay filter 2 is a transversal digital filter containing variable filter coefficients which are capable of either advancing or retarding the time registration of the signal with a precision of d seconds. It is desirable to make d as small as possible but this increases the total number of unique delays that the variable delay filter must synthesize. Each unique delay requires a separate set of filter coefficients and therefore it is necessary to compromise between time resolution, d, and system complexity. The sample half-beam outputs are clipped in clippers 4 and 6 and correlated in a correlator 10. One half-beam is delayed in a bulk delay circuit 8. The correlator 10 computes the correlation function at various discrete time intervals. The discrete time intervals are normally equal to the sample rate of the digital beamformer used to provide the half beams. The outputs of the correlator consists of the correlogram values $$-R(-2), R(-1), R(0), R(1), R(2),$$

where R (n) is the correlation between the two half-beams at n discrete time intervals. Each correlogram is computed from a specific number of input samples which we will assume to be 1024 samples. The expected output at the zero delay point on the correlation function $$R(0) = 1024 \frac{2}{\pi} \text{ARCSIN} \frac{S}{N+S}$$

is a function of half beam signal to noise ratio (S/N). The value R(0) can be smoothed and used to determine signal-to-noise ratio for the target under track by solving the above equation for the ratio (S/N). This equation is easily solved on a digital computer.

The error signal output of asymmetry detector 12 is based on the derivative of the expected value of the auto correlation of the signal. The error signal, e, used by the tracker is given by $$e = \sum_{n=1}^{\infty} G(n)R(n) + G(-n)R(-n)$$

where
R is the cross-correlation functions of the half-beam outputs developed digitally at discrete time intervals.
G is the derivative of the expected value of auto correlation of the clipped signal normalized.

For reasonably small values of e, the error signal is proportional to the tracker error. A satisfactory approximation of G is $$G(n) = SGN(n) n \leq 2$$

$$G(n) = 0 n > 2$$

The invention is illustrated with this formulation of G but other more general formulations of G may be implemented. A position counter 18 is updated by a fixed step, D, derived by applying the error signal e from asymmetry detector 12 to circuit 14 in a direction specified by the algebraic sign of e. Alternatively, the position counter may be updated by an amount proportional to the magnitude of e. In order to track moving targets, it is desirable, but optional to utilize bearing rate compensation. Bearing rate compensation reduces tracker lag error and allows the use of longer averaging times of the error signal to reduce random error. Because rate compensation is desirable, the preferred embodiment disclosed contains this provision. A rate counter 20 is updated by a fixed step D/l. l is an integer power of 2 to simplify the hardware. A value of l of 64 was chosen and was found to give satisfactory performance. The value of D is chosen to be a power of 2 subdivisions of the sampling interval of the beamformer data. The RMS error at the output of the tracker will have a lower bound of D. Clearly, the necessary time-delay required in the variable delay digital filter to equalize the time-registrations of the two half-beam signals determines the target direction when combined with the array geometry. For a constant bearing rate target, the rate counter will build up to a value proportional to the rate and will update the position counter accordingly.

The rate counter can be used to indicate target bearing rate directly since its contents represent the target bearing rate multiplied by the sampling interval. The rate counter also gives the tracker solution a momentum proportional to target bearing rate which will continue to update the target position during temporary loss of signal. The position counter value is quantized in integer multiples of the step size in a quantizer 22 and fed back to variable delay filter 2. This results in a finite number of delays to be synthesized by the variable delay filter and hence only a finite set of filter coefficients is required. The maximum delay to be synthesized is determined by the array geometry and speed of signal propagation. Moving targets will generally move from one half-beam pair to the adjacent half-beam pair. Therefore, there must be provisions for beam-handover or half-beam pair switching. Our invention incorporates the following provisions for this operation. When the position counter reaches a pre-determined value it is reset to a corresponding value to steer in the known target direction for the adjacent half-beam pair. A beam select switch sends this adjacent half-beam pair to the variable delay filter. In order to avoid sustained switching between beams for targets located approximately half way between half-beam pairs a hysteresis like overlap is implemented. The count stored in the position counter is allowed to increase to a value corresponding to more than half the interval to the next beam-center before the switch to this beam is made.

The contents of the position counter specify the number of time increments (i.e. d seconds) between the time of arrival for the signals in the left and right half-beams. This information is used to determine the angle $\theta$, between the signal direction and beam steering direction (i.e., maximum response axis). The angle $\theta$ is calculated by the equation $$Kd = \frac{l}{c} \sin \theta$$

The value l is the distance between half-beam phase centers (i.e., arithmetic average of the positions of individual transducers in each half-beam), c is the speed of signal propagation, K is the contents of the position counter and d is the incremental time precision. This equation can be solved using standard digital computing circuits or on general purpose digital computers. When the angle $\theta$ has been computed, the target angle is determined by adding $\theta$ to the angular position for which the half-beams are steered (i.e., the look direction).

The tracker is stabilized for movement of its platform by injecting the approximate angular rate of the platform into the position counter on an input line 26. This makes the tracker solution independent of the platform motion.

The variable delay filter is a transversal filter which implements the following algorithm:

$$f_{out}(nT) = \sum_{m=-N}^{+N} C_m f_{in}(nT - mT)$$

where

T is the sampling interval $f_{in}$ is the half-beam input function $f_{out}$ is the advanced or retarded output function $C_m$ are the filter coefficients N is half the number of taps less one of the transversal filter.

The fixed bulk delay filter in the other channel retards this half-beam's output signal by N sampling intervals. With reference to this retarded output, the data passing through the variable delay filter is available for N sampling instants in both advanced and retarded time registration.

Note that the sampling interval must be less than or equal to that required by the Nyquist sampling criteria.

The ideal interpolation function defining the coefficients require theoretically an infinite number of taps. However, nine taps and coefficients rounded to 10 bits plus sign have been found to be generally satisfactory.

The relationship defining the coefficients is given by $$C_m = RO_k \left[ \frac{\sin \pi (m - t/T)}{\pi (m - t/T)} (0.5 + 0.5 \cos \frac{\pi}{N+1} (m - t/T)) \right]$$

where $RO_k$ is a function which rounds its argument to K bits plus sign

T is the sampling interval t is the delay to be synthesized m is the tap index for the filter $2N+1$ is the total number of taps for the filter.

This weighting function contains the perfect but unrealizable Sin X/X interpolation function which will yield perfect interpolation if properly convolved with an adequately sampled time function over an infinite interval. A finite interval implied by a finite number of filter coefficients was found to be adequate when the ideal interpolation function was multiplied by a "Hanning Window" (See R. B. Blackman and J. W. Tukey, "The Measurement of Power Spectra", Dover Publications, N.Y., N.Y., 1958) which smooths the function by suppressing high frequency components of the truncated interpolation function's frequency response. These high frequency components may lie within the passband of interest because of the holding of the frequency spectrum about half the sampling frequency, a digital filter phenomenon.

While the invention has been particularly shown and described with reference to a preferred embodiment thereof, it will be understood by those skilled in the art that various changes in form and detail may be made without departing from the spirit and scope of our invention.

What is claimed is:

1. In a half-beam digital target tracking apparatus having means for generating target indicating signals comprising a plurality of half-beam pairs, the improvement comprising:

means for selecting half-beam pairs, a variable delay digital filter for advancing or delaying the time registration of the signal content of one half-beam relative to the other half-beam, error responsive means for sensing and averaging a difference in time registrations of the two half-beam signals by adjusting a delay synthesized by said variable delay digital filter, and computing means for computing the direction to a particular target from a particular delay synthesized by the variable delay digital filter.

2. The combination according to claim 1 and including apparatus to compensate for target angular rate comprising:

sensing means for sensing the change in time registration of the two half-beam signals, second computing means for computing the average rate of change of said time registration, and compensating means for compensating the delay synthesized by the variable-delay digital filter for the effect of the average rate of change of time registration of the two half-beam target signals.

3. The combination of claim 2 and including platform compensating apparatus for compensating for the effect of angular motion of the tracking apparatus when said apparatus is mounted on a mobile platform.

4. The combination of claim 3 and including:

inhibiting means to inhibit half-beam pair switching unless the change in target angle position has exceeded a specified minimum change.

5. The combination of claim 4 and including:

means to determine the algebraic error of the tracker error signal, and means to periodically update the target position by a factor having fixed magnitude and a variable algebraic sign determined from the algebraic sign of the tracker error signal.

6. The combination of claim 5 and including apparatus to determine the target signal-to-noise ratio comprising:

means to cross-correlate the two half-beam signals after compensation for difference in time registrations, and means to compute the target signal-to-noise ratio from the half-beam cross-correlation.

* * * * *